United States Patent Office 3,079,446
Patented Feb. 26, 1963

3,079,446
PRODUCTION OF HALOPRENES
Alistair C. MacFarlane, Texas City, Tex., assignor to Monsanto Chemical Company, St. Louis, Mo., a corporation of Delaware
No Drawing. Filed July 12, 1960, Ser. No. 42,229
10 Claims. (Cl. 260—655)

The present invention relates to the production of haloprenes and in particular to an improvement in the method for producing haloprenes by alkali dehydrohalogenation of a 1,2-dihalobutene-3.

It is well known that a haloprene or a 2-halobutadiene-1,3 can be produced by treating a 1,2-dihalobutene-3 with solid alkalies. Such a method is described for the preparation of chloroprene (2-chlorobutadiene-1,3) from 1,2-dichlorobutene-3 in U.S. Patent 2,038,538. Yields in this process, however, are not always satisfactory, reaction time is long, and operation is cumbersome and inefficient because of the necessity for handling large quantities of solids in the reaction system. Some of these difficulties are eliminated by using anhydrous solutions of the alkalies, particularly alcoholic alkalies as proposed in U.S. Patent 2,180,115. However, with this technique elaborate procedures are necessary for the recovery of the product which are not suitable for large scale operations and yields are not completely satisfactory. With aqueous solutions of alkalies as employed in U.S. Patent 2,430,016, some of the disadvantages of the method already mentioned are eliminated, e.g., by-product salt formed is kept in solution so that its collection as a solid in the reaction vessel is avoided, but the rate of reaction is somewhat slow and the high temperatures employed promote undesirable side reactions such as the polymerization of the haloprene product.

According to the present invention, haloprenes are produced by treating a 1,2-dihalobutene-3 with an alkali in the presence of both water and an organic solvent, the organic solvent being chosen from the polyethers, ether-alcohols, polyglycols or water-soluble cyclic ethers. The mixed organic solvent-aqueous alkali system overcomes many of the difficulties inherent in the prior art methods, effects an increase in rate of reaction by a factor of 10–20 while yields remain equivalent or are better than those of the known methods, and significantly reduces polymerization by reducing the temperature at which the reaction can be carried out.

The invention is illustrated in the following examples but is not to be considered as limited in any manner whatsoever by such examples.

Example 1

Approximately 88 g. (2.2 moles) of solid sodium hydroxide was charged to a reaction flask equipped with a dropping funnel, a stirrer, and a small distilling column attached to a water-cooled condenser. About 25 ml. of 1,2-dichlorobutene-3 was added to the flask and it was then heated to about 100–110° C. after which 100 g. of 1,2-dichlorobutene-3 was added dropwise while the temperature was maintained at this level by proper cooling. The effluent vapors were continuously distilled off through the attached column during the reaction period of 6 hrs. The distillate was analyzed and based on the analysis the yield of chloroprene was calculated to be 86.8% based on the amount of dichlorobutene consumed. The residue remaining in the reaction flask, however, was a viscous, semi-crystalline mass of unreacted dichlorobutene, sodium chloride, water, and a sizeable amount of a heavy yellow polymeric material.

Example 2

To a refluxing solution of 44.0 g. (1.1 mole) of sodium hydroxide in one liter of ethanol there was added 125 g. (1.0 mole) of 1,2-dichlorobutene-3 gradually over a period of about 30 min. The resulting slurry was then refluxed for an additional one-hour period. The excess caustic was neutralized with hydrochloric acid and the mixture was filtered to remove the solid salt therefrom. The salt precipitate was washed with 100 cc. of ethanol and the washing was combined with the filtrate. Fractionation of the combined filtrate and wash liquor yielded 81 g. of chloroprene. However, the reaction was hard to control because of salt precipitating out of the mixture and causing "bumping" in the reaction flask. Also, the reaction mixture was a heavy slurry which was difficult to handle.

Example 3

A solution of 44 g. (1.1 mole) of sodium hydroxide in 250 cc. of water was heated to 105° C. in a reaction flask similar to that of Example 1 and 125 g. (1.0 mole) of 1,2-dichlorobutene-3 was added to it with vigorous stirring over a period of two hours. The two-phase mixture was heated at 105° C.–110° C. for an additional 6 hours while chloroprene was removed as an azeotrope with water at 50° C.–70° C. vapor temperature. The yield of chloroprene was 46.6 g. (53%). The residue in the reaction flask consisted of sodium chloride solution and a large amount of yellow amorphous polymer.

Example 4

A mixture of 2-methoxyethanol ("Methyl Cellosolve") and water in the proportions of the azeotrope formed from these two compounds (23% 2-methoxyethanol) together with 10 ml. of 1,2-dichlorobutene-3 and 5 cc. of a 50% aqueous sodium hydroxide solution were charged to a reaction flask equipped as in Example 1. The mixture was heated and thereafter 1,2-dichlorobutene-3 and 50% caustic solution were added simultaneously to the flask until a total of approximately 1.1 mole of caustic and 1 mole of dichlorobutene had been charged to the reaction. The effluent vapors were continuously distilled off throughout the reaction period of 75 minutes while the temperature of the reaction was maintained at about 85° C. The water-chloroprene azeotrope collected was separated by decantation and the organic material remaining in the flask was subjected to distillation. Based on analysis of the distillate 100% conversion of dichlorobutene was obtained with a yield of chloroprene of 84.1%. The residue in the reaction flask was a free flowing liquid containing little or no solid or polymeric material.

Example 5

A mixture of 40 ml. of 2-ethoxyethanol ("Cellosolve") and 120 ml. of water was charged to a reaction flask and 88 g. of a 50% aqueous caustic solution together with 125 g. of 1,2-dichlorobutene-3 was then introduced into the flask via two dropping funnels over a period of about 60 min. The temperature of the reaction mixture was maintained at approximately 80° C. From the chloroprene-water azeotrope distilled off, 63 g. of chloroprene were recovered while an additional 5.8 g. of chloroprene was obtained from the organic layer of the distillate. Conversion of dichlorobutene was 91.8% and yield of chloroprene based on conversion was 85%. Practically no loss due to polymerization occurred.

Example 6

The experiment of Example 4 was repeated except that dioxane was employed as the solvent instead of "Cellosolve." The yield of chloroprene in this instance was 98.5% based on a conversion of 88.3% over a reaction period of 45 minutes.

It is evident from the examples that the process of the invention (Examples 4, 5 and 6) provides comparable, or in some instances better, yields of chloroprene over much shorter reaction periods with little or no loss due to polymerization while at the same time obviating many of the difficult handling operations characteristic of the prior art reaction systems (Examples 1, 2, and 3).

Many variations can be made in the process of the invention without departing from the scope thereof. Suitable solvents besides those mentioned include other ether-alcohols such as isopropoxy ethanol, butoxy ethanol, methoxy propanol, ethoxy butanol and the like; other cyclic ethers such as furane, tetrahydrofurane, pyran, and the like; polyethers known to the trade under the name "Carbitols" such as dimethoxy ethane (dimethyl ether of ethylene glycol), diethoxy ethane, diisopropoxy ethane, dibutoxy ethane and the like; and polyglycols such as diethylene glycol, triethylene glycol, dipropylene glycol and the like.

The volume of solvent and water employed should be kept as low as possible in order that the size of the process equipment or apparatus will be in a practical range. However, enough water must be used to keep the salt produced in solution and avoid the handling of a slurry. This is accomplished generally by adding water in the amount necessary to yield a saturated brine or salt solution, i.e., from about 5 to about 10 moles of water per mole of alkali employed. Preferably, water is employed in an amount from about 6 to 7 moles per mole of alkali. The quantity of solvent then may vary from about 10% to about 50% by volume of water present but preferably is in the range from about 20% to about 25% by volume of the water used.

The preferred alkalies for use in the process are the alkali metal hydroxides, particularly sodium and potassium hydroxides, because of their ready availability and relatively low cost. However, other alkalies such as ammonium, lithium or rubidium hydroxides, lime or alkaline earth metal hydroxides such as calcium, strontium, and barium hydroxides, and carbonates such as sodium carbonate, potassium carbonate and the like can be employed although reaction rates are considerably slower when these are used as dehydrohalogenation agents.

The concentration of the aqueous alkali solution may vary considerably since the water in the system may be added with the solution or as such. Any concentration can be used, therefore, but the preferred one for either sodium or potassium hydroxide because of economical considerations is the 50% solution which is commercially available. The amount of alkali used may also be varied. Suitable mole ratios of alkali to halobutene are those from 1:1 to 2:1. One of the particular advantages of the process of the invention is that it does not require the substantial excesses of alkali which are characteristic of the prior art processes.

The process may be carried out at temperatures within the range from 80° C. to 120° C. but the preferred temperatures are those from 85° C.–90° C. Reaction time may range from 10 minutes to several hours depending on the temperature used and conversion level desired. Longer times are required for a given conversion at lower temperatures.

The process is particularly adapted for continuous operation but may also be carried out batchwise or intermittently. Operation at atmospheric pressure is preferable but operation at superatmospheric or subatmospheric pressures is feasible.

The invention is not to be considered as limited to the production of chloroprene since any 1,2-dihalobutene-3 may be reacted according to the method thereof to obtain a haloprene. Bromoprene may be produced from 1,2-dibromobutene-3, for example, and similarly fluoroprene is obtained from 1-chloro-2-fluorobutene-3 whereas chloroprene may also be obtained from 1-bromo-2-chlorobutene-3.

What is claimed is:

1. A process for the preparation of a 2-halobutadiene-1,3 which comprises heating a 1,2-dihalobutene-3 at a temperature within the range from about 80° C. to about 120° C. with an alkali metal hydroxide in the presence of both water and an organic solvent chosen from the group consisting of ether-alcohols and water-soluble cyclic ethers.

2. A process for the preparation of a 2-halobutadiene-1,3 which comprises heating a 1,2-dihalobutene-3 with an alkali metal hydroxide in a mole ratio of from 1:1 to 1:2 at a temperature within the range from about 80° C. to about 120° C. in the presence of both water and an organic solvent chosen from the group consisting of ether-alcohols and water-soluble cyclic ethers, said water being present in an amount from about 5 to about 10 moles per mole of said alkali metal hydroxide and said organic solvent being present in an amount in the range from about 10% to about 50% by volume of said water.

3. The process of claim 2 wherein said organic solvent is 2-methoxy ethanol.

4. The process of claim 2 wherein said organic solvent is 2-ethoxy ethanol.

5. The process of claim 2 wherein said organic solvent is dioxane.

6. A process for the preparation of 2-chlorobutadiene-1,3 which comprises heating 1,2-dichlorobutene-3 at a temperature in the range from about 85° C. to about 90° C. with an alkali metal hydroxide in the presence of both water and an organic solvent chosen from the group consisting of ether-alcohols and water-soluble cyclic ethers.

7. A process for the preparation of 2-chlorobutadiene-1,3 which comprises heating 1,2-dichlorobutene-3 with an alkali metal hydroxide in a molecular ratio of from 1:1 to 1:2 at a temperature within the range from about 85° C. to about 90° C. in the presence of both water and an organic solvent chosen from the group consisting of ether-alcohols and water-soluble cyclic ethers, said water being present in an amount in the range from about 6 to about 7 moles per mole of said alkali metal hydroxide and said organic solvent being present in an amount from about 20% to about 25% by volume of said water.

8. The process of claim 7 wherein said organic solvent is 2-methoxy ethanol.

9. The process of claim 7 wherein said organic solvent is 2-ethoxy ethanol.

10. The process of claim 7 wherein said organic solvent is dioxane.

References Cited in the file of this patent

UNITED STATES PATENTS

| | | |
|---|---|---|
| 2,430,016 | Hearne et al. | Nov. 4, 1947 |
| 2,543,648 | Strosacker et al. | Feb. 27, 1951 |
| 2,942,038 | Jenkins | June 21, 1960 |

FOREIGN PATENTS

| | | |
|---|---|---|
| 492,689 | Great Britain | Sept. 26, 1938 |